(12) United States Patent
Mori et al.

(10) Patent No.: US 10,401,856 B2
(45) Date of Patent: Sep. 3, 2019

(54) VEHICLE TRAVEL CONTROL APPARATUS

(71) Applicant: HONDA MOTOR CO., LTD., Tokyo (JP)

(72) Inventors: Yoshihiro Mori, Wako (JP); Kuniaki Matsushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 15/294,155

(22) Filed: Oct. 14, 2016

(65) Prior Publication Data

US 2017/0115662 A1    Apr. 27, 2017

(30) Foreign Application Priority Data

Oct. 22, 2015  (JP) ................................. 2015-207717

(51) Int. Cl.
*G05D 1/00* (2006.01)
*G07C 5/08* (2006.01)
(Continued)

(52) U.S. Cl.
CPC .......... *G05D 1/0088* (2013.01); *B60W 30/00* (2013.01); *B62D 15/025* (2013.01);
(Continued)

(58) Field of Classification Search
CPC .............. G05D 1/0088; G05D 1/0223; G05D 2201/0213; B60W 30/00; B62D 15/025; G07C 5/0808
(Continued)

(56) References Cited

U.S. PATENT DOCUMENTS 5,671,138 A * 9/1997 Bessacini ................. G05D 1/12
                                                    244/3.13
9,669,869 B2 * 6/2017 Kageyama ............... B62D 5/00
(Continued)

FOREIGN PATENT DOCUMENTS

JP     H9-123792 A      5/1997
JP     2008-143293 A    6/2008

OTHER PUBLICATIONS

Office Action dated Jul. 18, 2017, issued in counterpart Japanese Application No. 2015-207717, with machine translation. (6 pages).

*Primary Examiner* — Anne M Antonucci
*Assistant Examiner* — James E Stroud
(74) *Attorney, Agent, or Firm* — Westerman, Hattori, Daniels & Adrian, LLP

(57) ABSTRACT

A vehicle running control apparatus capable of enabling a vehicle to more easily follow a target running state and improving the running stability of the vehicle is provided. A running state obtaining unit obtains the actual running state (actual running path or running position) of a vehicle. A target running state setting unit sets the target running state (target path or target position) of the vehicle. A deviation obtaining unit obtains a deviation of the actual running state from the target running state. A running support controller performs running support control of the vehicle such that the running state of the vehicle becomes identical or closer to the target running state. At this time, a correction unit makes the target running state closer to the actual running state as the deviation becomes greater.

8 Claims, 8 Drawing Sheets

(51) Int. Cl.
  *B62D 15/02* (2006.01)
  *B60W 30/00* (2006.01)
  *G05D 1/02* (2006.01)
(52) U.S. Cl.
  CPC ......... *G05D 1/0223* (2013.01); *G07C 5/0808* (2013.01); *G05D 2201/0213* (2013.01)
(58) Field of Classification Search
  USPC ........................................................ 701/25
  See application file for complete search history.

(56) References Cited

U.S. PATENT DOCUMENTS

| | | | |
|---|---|---|---|
| 2006/0069478 A1* | 3/2006 | Iwama | B62D 15/0245 701/36 |
| 2013/0245890 A1* | 9/2013 | Kageyama | B62D 7/18 701/41 |
| 2014/0008141 A1* | 1/2014 | Kageyama | B62D 5/00 180/400 |
| 2017/0036678 A1* | 2/2017 | Takamatsu | B60W 10/04 |

* cited by examiner

VEHICLE TRAVEL CONTROL APPARATUS

CROSS REFERENCES TO RELATED APPLICATIONS

The present application claims priority under 35 U.S.C. § 119 to Japanese Patent Application No. 2015-207717, filed Oct. 22, 2015, entitled "Vehicle Travel Control Apparatus." The contents of this application are incorporated herein by reference in their entirety.

TECHNICAL FIELD

The present disclosure relates to a vehicle running control apparatus that performs vehicle running support control (including automated driving control and semi-automated driving control) for making the running state of a vehicle identical or closer to a target running state.

BACKGROUND

Japanese Unexamined Patent Application Publication No. 2008-143293 discloses control for detecting the running position of a vehicle and calculating the value of current to be supplied to a steering actuator in accordance with a target steering angle of a steering wheel, the current steering angle, and the current vehicle speed such that the running path of the vehicle becomes identical to a target path. In this control, the value of current supplied to the steering actuator is calculated in accordance with an estimated coefficient of friction with a road surface.

In Japanese Unexamined Patent Application Publication No. 2008-143293, an appropriate control amount is calculated in accordance with a coefficient of friction with a road surface, thereby improving the convergence of a steering angle to a target steering angle, and, regardless of the coefficient of friction with the road surface, promptly making the running path of the vehicle identical to the target path.

By the way, if the running path becomes deviated from the target path in a situation where the vehicle speed is high, the roadway is sharply curved, or the coefficient of friction with the road surface is lowered due to rain or snow, it is difficult to correct the deviation. Even if the vehicle is controlled with a great control amount in such a case where the deviation is great, the vehicle may not be able to sufficiently follow the target path. Furthermore, the occurrence of sudden acceleration/deceleration or steering is not desirable.

SUMMARY

The present application describes, for example, a vehicle running control apparatus capable of enabling a vehicle to more easily follow a target running state and improving the running stability of the vehicle.

A vehicle running control apparatus according to an aspect of the present application includes a running state obtaining unit that obtains an actual running state, which is a current running state of a vehicle; a target running state setting unit that sets a target running state, which is a target running state of the vehicle; a deviation obtaining unit that obtains a deviation of the actual running state from the target running state; a controller that performs running support control of the vehicle such that, when the deviation obtaining unit obtains the deviation, the running state of the vehicle becomes identical or closer to the target running state; and a correction unit that makes the target running state, set by the target running state setting unit, closer to the actual running state as the deviation becomes greater.

As in the above-described configuration, the present application describes, for example, that the target running state is corrected to be closer to the current running state as the deviation of the current running state from the target running state becomes greater. Accordingly, when the deviation is small, running support is provided to enable the vehicle to follow a preset target running state. Therefore, scheduled running becomes possible. In contrast, when the deviation is great, it becomes easier for the vehicle to follow the target running state. Therefore, excessive vehicle control can be prevented in automated driving or semi-automated driving, thereby enhancing the running stability of the vehicle.

The vehicle running control apparatus may further include an external condition obtaining unit that obtains an external condition of the vehicle. The running state obtaining unit may include a running path obtaining unit that obtains an actual running path of the vehicle. The target running state setting unit may include a target path setting unit that sets a target path of the vehicle on the basis of the external condition obtained by the external condition obtaining unit. The deviation obtaining unit may obtain a deviation of the actual running path from the target path. The controller may perform running support control of the vehicle such that, when the deviation obtaining unit obtains the deviation, the running path of the vehicle becomes identical or closer to the target path. The correction unit may make the target path, set by the target path setting unit, closer to the actual running path as the deviation becomes greater.

As in the above-described configuration, the present application describes, for example, that running support is provided to enable the vehicle to follow the currently set target path when a deviation of the actual running path from the target path is small. Accordingly, when the deviation is small, it becomes possible for the vehicle to run along a scheduled path or a path closer thereto. In contrast, when the deviation is great, it becomes easier for the vehicle to follow the target path. Therefore, excessive vehicle control can be prevented in automated driving or semi-automated driving, thereby enhancing the running stability of the vehicle.

The running state obtaining unit may include a running position obtaining unit that obtains a running position of the vehicle. The target running state setting unit may set a target position of the running position. The deviation obtaining unit may obtain a deviation of the running position, obtained by the running position obtaining unit, from the target position. The correction unit may correct the target position to be more rearward in a progressing direction as the deviation becomes greater.

As in the above-described configuration, the present application describes, for example, that support is provided to control the running position. Accordingly, it becomes easier for the vehicle to follow the target position or the target path. Therefore, excessive vehicle control can be prevented in automated driving or semi-automated driving, thereby enhancing the running stability of the vehicle.

The running state obtaining unit may include at least one of a vehicle speed obtaining unit that obtains a vehicle speed, which is a running speed of the vehicle, and a Yaw rate obtaining unit that obtains a Yaw rate of the vehicle. The target running state setting unit may set a target value of at least one of the vehicle speed and the Yaw rate. The deviation obtaining unit may obtain at least one of a deviation of the vehicle speed, obtained by the vehicle speed obtaining unit, from the target value of the vehicle speed, and a deviation of the Yaw rate, obtained by the Yaw rate obtaining unit, from the target value of the Yaw rate. The correction unit may lower the target value as the deviation becomes greater.

As in the above-described configuration, the present application describes, for example, that support is provided to control the vehicle speed or the Yaw rate. Accordingly, it becomes easier for the vehicle to follow the target vehicle speed or the target Yaw rate. Therefore, excessive vehicle control can be prevented in automated driving or semi-automated driving, thereby enhancing the running stability of the vehicle.

The vehicle running control apparatus may further include a vehicle speed obtaining unit that obtains a vehicle speed, which is a running speed of the vehicle; and an acceleration/deceleration controller that supports acceleration/deceleration of the vehicle. The correction unit may correct the target path or the target position on the basis of the running position obtained by the running position obtaining unit. The controller may perform acceleration/deceleration control using the acceleration/deceleration controller on the basis of the vehicle speed obtained by the vehicle speed obtaining unit such that the vehicle follows the corrected target path or the corrected target position, and may set a number of updates per unit time of a command value in the acceleration/deceleration control to be greater than a number of updates per unit time of the target path, the updates being performed by the correction unit.

According to the present application, for example, the responsiveness of vehicle speed adjustment can be enhanced, and accordingly the position adjustment can be made responsive in accordance therewith. In doing so, the stability of controlling the vehicle to follow the target path can be improved.

The vehicle running control apparatus may further include a steering angular velocity obtaining unit that obtains a steering angular velocity of the vehicle; and a steering controller that supports steering of the vehicle. The correction unit may correct the target path on the basis of the running position obtained by the running position obtaining unit. The controller may perform steering control using the steering controller on the basis of the steering angular velocity obtained by the steering angular velocity obtaining unit such that the vehicle follows the corrected target path, and may set a number of updates per unit time of a command value in the steering control to be greater than a number of updates per unit time of the target path, the updates being performed by the correction unit.

According to the present application, for example, the responsiveness of steering adjustment can be enhanced, and accordingly the position adjustment can be made responsive in accordance therewith. In doing so, the stability of controlling the vehicle to follow the target path can be improved.

BRIEF DESCRIPTION OF THE DRAWINGS

The advantages of the disclosure will become apparent in the following description taken in conjunction with the following drawings.

DETAILED DESCRIPTION

Figure 1:
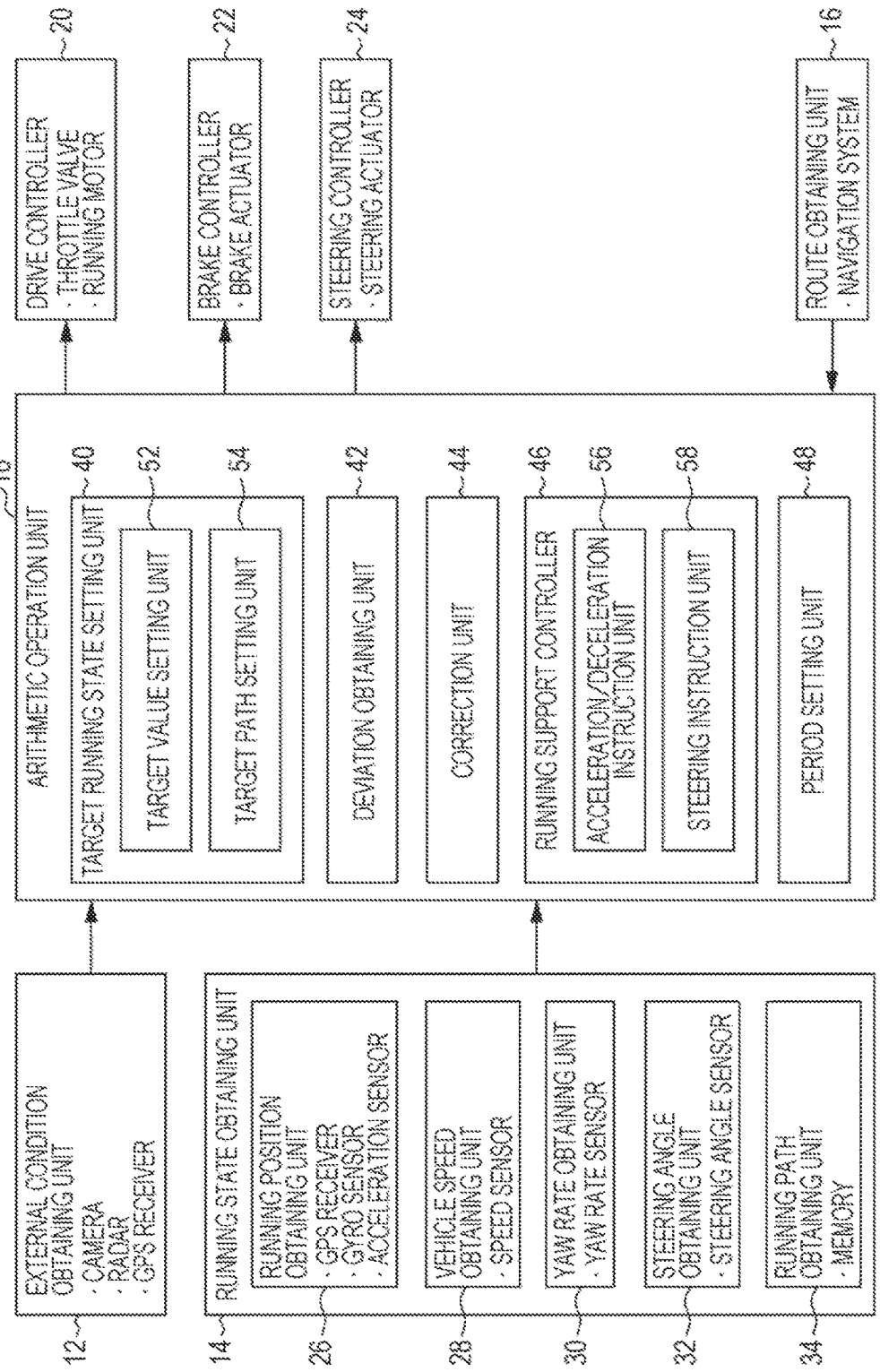
FIG. 1 is a functional block diagram of a vehicle running control apparatus of an embodiment.

Hereinafter, preferred embodiments of a vehicle running control apparatus 10 according to the present application will be described in detail with reference to the accompanying drawings.

1. Configuration of Vehicle Running Control Apparatus 10

The configuration of the vehicle running control apparatus 10 will be described using FIG. 1. The vehicle running control apparatus 10 includes various information obtaining units 12, 14, and 16, an arithmetic operation unit 18, which performs arithmetic operations regarding running support control of a vehicle 100 (see FIGS. 2 and 6) on the basis of information obtained by the information obtaining units 12, 14, and 16, and various vehicle controllers 20, 22, and 24, which control to-be-controlled equipment in accordance with command values output from the arithmetic operation unit 18.

1-1. Various Information Obtaining Units 12, 14, and 16

The external condition obtaining unit 12 is configured to obtain the external conditions of the vehicle 100, that is, information on the surrounding environment, such as the roadway lanes and the surrounding objects. The external condition obtaining unit 12 includes, for example, various cameras (monocular camera, stereo camera, infrared camera, and so forth) and various radars (millimeter-wave radar, micro-wave radar, laser radar, and so forth). The external condition obtaining unit 12 may use a fusion sensor that integrates information obtained by the cameras with information obtained by the radars. The external condition obtaining unit 12 may use a device (Global Positioning System (GPS) receiver, Global Navigation Satellite System (GNSS) receiver, beacon receiver, or the like) that receives electromagnetic waves transmitted from a satellite or road equipment and obtains road information (the length and width of the roadway, curve R, and so forth)

The running state obtaining unit 14 is configured to obtain an actual running state, which is the current running state of the vehicle 100. The running state obtaining unit 14 includes a running position obtaining unit 26, a vehicle speed obtaining unit 28, a Yaw rate obtaining unit 30, a steering angle obtaining unit 32, and a running path obtaining unit 34.

The running position obtaining unit 26 is configured to obtain the running position Ps (see FIGS. 2 and 6) of the vehicle 100, which is one running state, and the posture (progressing direction) of the vehicle 100. The running position obtaining unit 26 includes various positioning devices, such as a device (GPS receiver, GNSS receiver, beacon receiver, or the like) that receives electromagnetic waves transmitted from a satellite or road equipment and obtains position information (latitude, longitude, altitude, coordinates, and so forth), a gyro sensor, an acceleration sensor, and the like. The running position Ps of the vehicle 100 is measured with reference to a specific portion of the vehicle 100.

The vehicle speed obtaining unit 28 is configured to obtain the speed (referred to as the vehicle speed) of the vehicle 100, which is one running state. The vehicle speed obtaining unit 28 includes, for example, a speed sensor provided on at least one wheel.

The Yaw rate obtaining unit 30 is configured to obtain the Yaw rate of the vehicle 100, which is one running state. The Yaw rate obtaining unit 30 includes, for example, a Yaw rate sensor.

The steering angle obtaining unit 32 is configured to obtain a steering angle, which is one running state. The steering angle obtaining unit 32 includes, for example, a steering angle sensor provided on a steering shaft. In this case, a steering angular velocity and a steering angular acceleration are additionally obtained on the basis of the obtained steering angle.

The running path obtaining unit 34 is configured to obtain information on the actual running path Os (see FIGS. 2 and 6) of the vehicle 100, which is one running state (may simply be referred to as the "actual running path Os"). The actual running path Os includes a path (track) where the vehicle 100 actually has run, and may additionally include a path to run, such as a frontward extension in the progressing direction of a path (track) where the vehicle 100 actually has run. The running path obtaining unit 34 includes a memory. The memory stores position information on a string of serial points included in the actual running path Os. The extension is predictable using a computer or the like.

The route obtaining unit 16 is configured to obtain information on a running route to a destination. The route obtaining unit 16 includes, for example, a navigation system.

1-2. Arithmetic Operation Unit 18

The arithmetic operation unit 18 includes an electronic control unit (ECU). The ECU is a computer including a microcomputer and includes a central processing unit (CPU), a read-only memory (ROM) (including an electrically erasable programmable read-only memory (EEPROM)), a random-access memory (RAM), and other input/output devices such as an analog-to-digital converter and a digital-to-analog converter. The ECU functions as various function-realizing elements by reading and executing, by the CPU, a program recorded in the ROM. In the embodiment, the ECU included in the arithmetic operation unit 18 executes the program, thereby functioning as a target running state setting unit 40, a deviation obtaining unit 42, a correction unit 44, a running support controller 46, and a period setting unit 48. The ECU may be divided into multiple sections, or may be integrated with other ECUs. Note that all or some of these functions may be realized by hardware.

The target running state setting unit 40 is configured to set a target running state, which is a target running state of the vehicle 100, on the basis of various types of information obtained by the external condition obtaining unit 12, the running state obtaining unit 14, and the route obtaining unit 16. The target running state setting unit 40 includes a target value setting unit 52 and a target path setting unit 54.

The target value setting unit 52 is configured to set information on a target running position (latitude, longitude, altitude, coordinates, and so forth) (may simply be referred to as target positions P5 and P6 (see FIGS. 2 and 6)) of the vehicle 100, vehicle speed target value information (may simply be referred to as a target vehicle speed), and Yaw rate target value information (may simply be referred to as a target Yaw rate). The target path setting unit 54 is configured to set information on a target path Of (see FIGS. 2 and 6) (may simply be referred to as a target path Of) of the vehicle 100 on the basis of the external conditions obtained by the external condition obtaining unit 12 and the running route information obtained by the route obtaining unit 16. The target path Of includes information on the target positions P5 and P6 every unit time. Each of the target positions P5 and P6 is associated with posture information (progressing direction) of the vehicle 100. Alternatively, each of the target positions P5 and P6 may be associated with target value information such as the vehicle speed, acceleration, Yaw rate, lateral G force, steering angle, steering angular velocity, and steering angular acceleration. The above-described target positions P5 and P6, the target vehicle speed, the target Yaw rate, and the target path Of are items of information indicating the target running state.

The deviation obtaining unit 42 is configured to obtain, on the basis of the target running state set by the target running state setting unit 40 and the actual running state obtained by the running state obtaining unit 14, a deviation of the actual running state from the target running state. When the target path Of is set as the target running state, a deviation of the actual running path Os from the target path Of is calculated. When the target positions P5 and P6 are set as the target running state, a deviation of the current running position Ps from the current target position P5 is calculated. When the target vehicle speed is set as the target running state, a deviation of the current vehicle speed from the current target vehicle speed is calculated. When the target Yaw rate is set as the target running state, a deviation of the current Yaw rate from the current target Yaw rate is calculated.

The correction unit 44 is configured to correct the target running state in accordance with the deviation obtained by the deviation obtaining unit 42. Specifically, a new target running state is set such that, as the deviation becomes greater, the target running state set by the target running state setting unit 40 is made closer to the actual running state obtained by the running state obtaining unit 14.

The running support controller 46 is configured to control the vehicle 100. Specifically, the running support controller 46 outputs a command value for running support control such that the running state of the vehicle 100 becomes identical or closer to the target running state set by the target running state setting unit 40 or the new target running state set by the correction unit 44. The running support controller 46 includes an acceleration/deceleration instruction unit 56 and a steering instruction unit 58.

The acceleration/deceleration instruction unit 56 is configured to perform acceleration and deceleration control, out of the vehicle running support control. Specifically, the acceleration/deceleration instruction unit 56 calculates an acceleration/deceleration command value for making the running state of the vehicle 100 identical to the target running state, on the basis of the target running state set by the target running state setting unit 40 or the correction unit 44 and the actual running state.

The steering instruction unit 58 is configured to perform steering control, out of the vehicle running support control. Specifically, the steering instruction unit 58 calculates a steering angular velocity command value for making the running state of the vehicle 100 identical to the target running state, on the basis of the target running state set by the target running state setting unit 40 or the correction unit 44 and the actual running state.

The period setting unit 48 is configured to set the number of times a command value is updated by the running support controller 46, that is, the period of various calculations.

1-3. Vehicle Controllers 20, 22, and 24

The drive controller 20 is configured to control driving of the vehicle 100 in accordance with an acceleration command value calculated by the acceleration/deceleration instruction unit 56. The drive controller 20 includes an engine and a throttle valve that adjusts the amount of fuel supplied to the engine when the vehicle 100 is an engine vehicle or a diesel vehicle, and includes an electric motor and a drive circuit of the electric motor when the vehicle 100 is an electric car. The drive controller 20 includes a throttle valve and a drive circuit of an electric motor for running when the vehicle 100 is a hybrid car. The drive controller 20 further includes a drive ECU that controls the throttle valve and the drive circuit.

The brake controller 22 is configured to control braking of the vehicle 100 in accordance with a deceleration command value calculated by the acceleration/deceleration instruction unit 56. The brake controller 22 includes a brake system including a friction brake and an electric parking brake, and a brake ECU that controls a brake actuator (a solenoid valve, an electric motor, or the like) of each brake included in the brake system.

The steering controller 24 is configured to control steering of the vehicle 100 in accordance with a steering angular velocity command value calculated by the steering instruction unit 58. The steering controller 24 includes an electric power steering device and a steering ECU that controls a steering actuator (electric motor or the like) of the electric power steering device.

2. Feedback Control Performed by Vehicle Running Control Apparatus 10

The vehicle running control apparatus 10 performs feedback control. How information is transmitted in feedback control will be described below. Note that FIG. 2 used in describing a first embodiment and FIG. 6 used in describing a second embodiment illustrate the paths Os, Of, and On and the positions Ps, P5, P6, and p6n in a deformed manner.

2-1. First Embodiment (When Correcting Entire Target Path)

Figure 2:
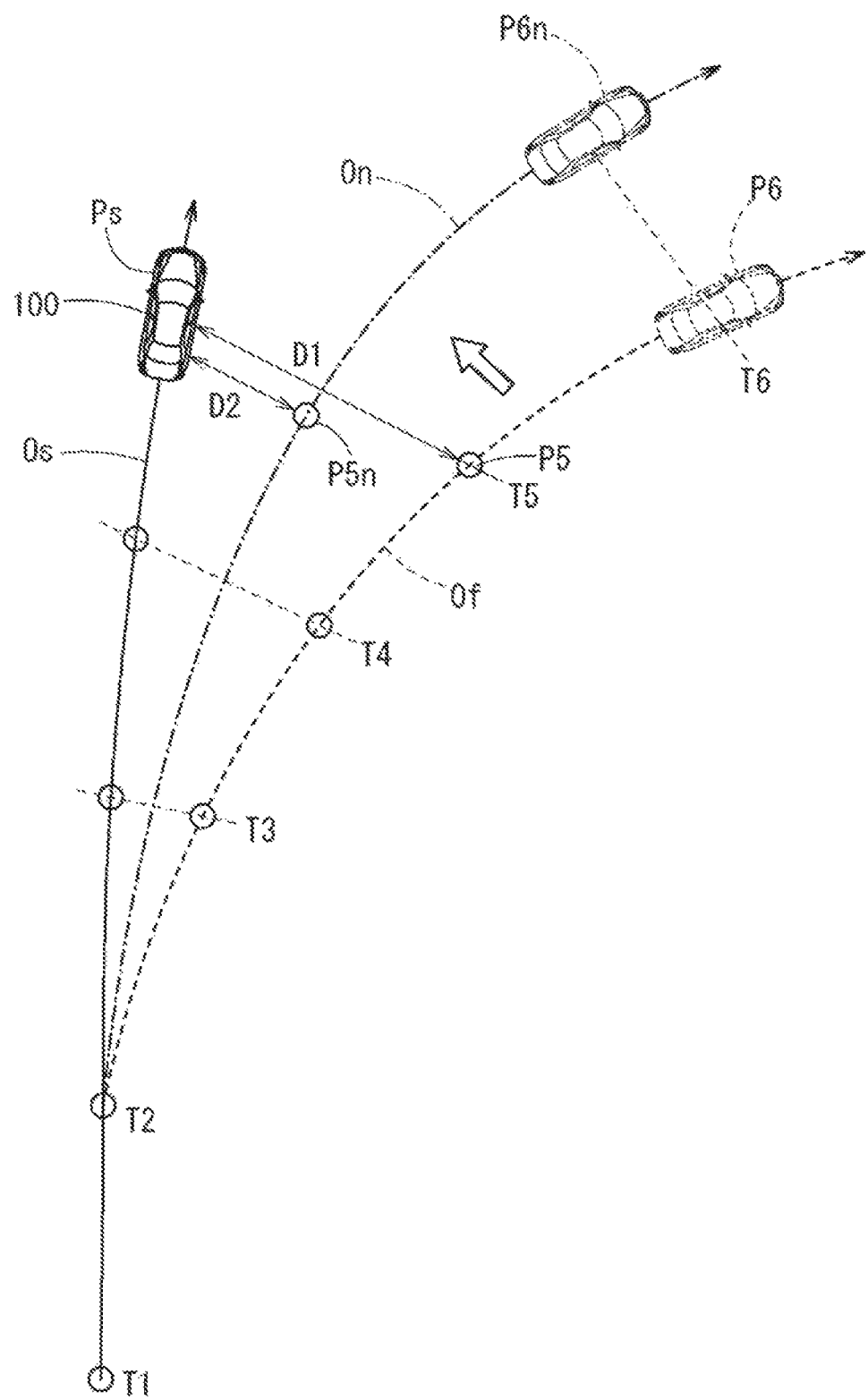
FIG. 2 is a diagram for describing correction of a target path according to a first embodiment.

Now, as illustrated in FIG. 2, the first embodiment will be described in which the target path Of, which is one target running state, is corrected to set a new target path On. In the first embodiment, feedback control such as that illustrated in FIG. 3 is performed.

2-1-1. Feedback System S1

Figure 3:
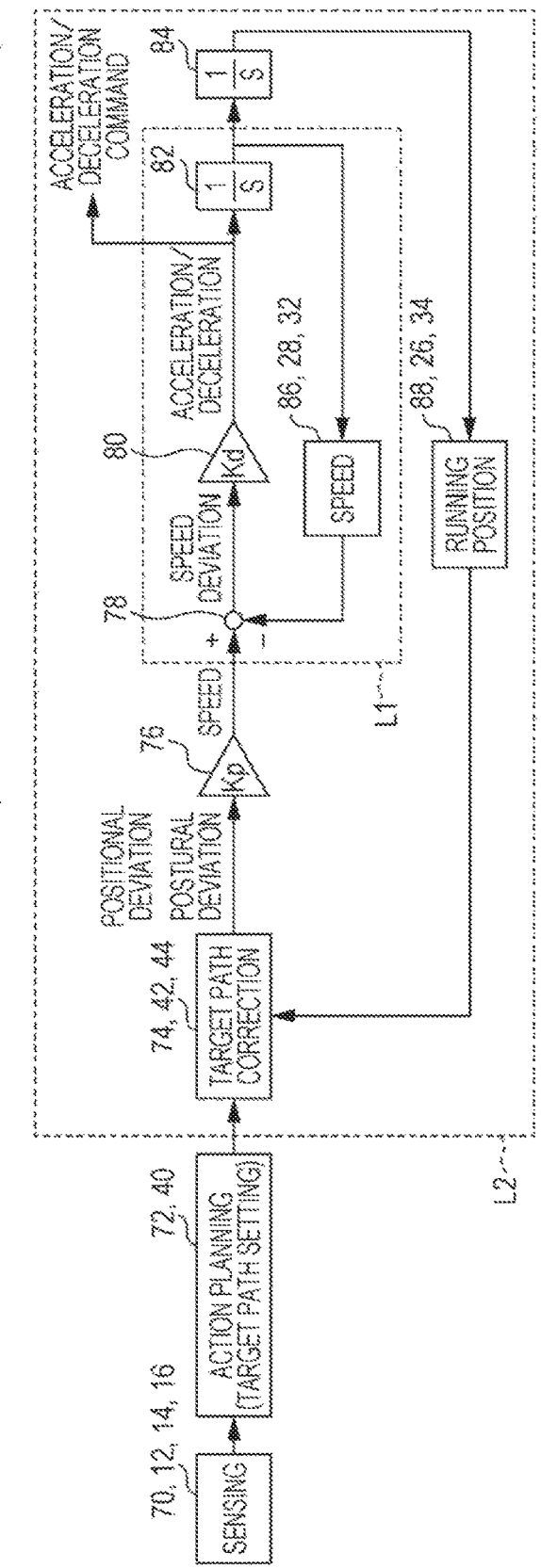
FIG. 3 is a block diagram of feedback control according to the first embodiment.

In a feedback system S1 illustrated in FIG. 3, a sensing block 70 corresponds to the external condition obtaining unit 12, the running state obtaining unit 14, and the route obtaining unit 16 illustrated in FIG. 1. An action planning block 72 corresponds to the target running state setting unit 40 illustrated in FIG. 1. A target path correcting block 74 corresponds to the deviation obtaining unit 42 and the correction unit 44 illustrated in FIG. 1. A proportional controller 76, a subtractor 78, a differentiator 80, and integrators 82 and 84 correspond to the running support controller 46 illustrated in FIG. 1. A speed detecting block 86 corresponds to the vehicle speed obtaining unit 28 and the steering angle obtaining unit 32 illustrated in FIG. 1. A running position detecting block 88 corresponds to the running position obtaining unit 26 and the running path obtaining unit 34 illustrated in FIG. 1. The subtractor 78, the differentiator 80, the integrator 82, and the speed detecting block 86 form a speed-dimensional feedback loop L1. The target path correcting block 74, the proportional controller 76, the speed-dimensional feedback loop L1, the integrator 84, and the running position detecting block 88 form a position-dimensional feedback loop L2.

The sensing block 70 obtains various types of information. Here, the external condition obtaining unit 12 obtains position information on the surrounding objects (preceding vehicles, pedestrians, structures, obstacles, and so forth) around the vehicle 100 and on the lanes. The running position obtaining unit 26 obtains the running position information of the vehicle 100. The vehicle speed obtaining unit 28 obtains vehicle speed information. The Yaw rate obtaining unit 30 obtains Yaw rate information. The steering angle obtaining unit 32 obtains steering angle information. The route obtaining unit 16 obtains running route information. The obtained various types of information are sent to the action planning block 72.

The action planning block 72 sets the optimum action plan on the basis of various types of information obtained by the sensing block 70. Here, the target path setting unit 54 sets the optimum target path Of along the running route. The set target path Of is sent to the target path correcting block 74.

Besides the target path Of being sent from the action planning block 72, the actual running path Os is sent from the running position detecting block 88 to the target path correcting block 74. The target path correcting block 74 corrects the target path Of, and further obtains a deviation of the current running position Ps from the next target position P6n on the corrected, new target path On. Here, the deviation obtaining unit 42 obtains a positional deviation D1 of the actual running path Os from the target path Of. Next, the correction unit 44 sets a new target path On in accordance with the positional deviation D1, and obtains a positional deviation and a postural deviation of the current running position Ps from the next target position P6n. The positional deviation corresponds to a positional correction amount to be corrected until the next calculation. The postural deviation corresponds to a postural correction amount to be corrected until the next calculation. The details of the process performed by the target path correcting block 74 will be described in "2-1-2. Target Path Correction and Deviation Acquisition" described below. The obtained positional deviation and postural deviation are sent to the proportional controller 76.

Among processes performed by the proportional controller 76 to the integrator 82 described below, a process regarding the vehicle speed is performed by the acceleration/deceleration instruction unit 56, and a process regarding steering is performed by the steering instruction unit 58.

The proportional controller 76 performs P control in which the gain is Kp (Unit $S^{-1}$). With the P control, a speed-dimensional vehicle speed command value is calculated from the positional deviation, and a speed-dimensional steering angular velocity (or Yaw rate, omitted below) is calculated from the postural deviation. The vehicle speed command value corresponds to a vehicle speed necessary for the vehicle 100 to reach the target position P6n until the next calculation. The angular velocity command value corresponds to a steering angular velocity necessary for the vehicle 100 to have a posture identical to the target posture until the next calculation. The command values are sent to the subtractor 78.

Besides the vehicle speed command value and the angular velocity command value being sent from the proportional controller 76, the current vehicle speed and the current steering angular velocity are sent from the speed detecting block 86 to the subtractor 78. The subtractor 78 calculates a deviation of the current vehicle speed from the vehicle speed command value, and calculates a deviation of the current steering angular velocity from the angular velocity command value. These speed command values are sent to the differentiator 80.

The differentiator 80 performs D control in which the gain is Kd (unit $S^{-1}$). With the D control, an acceleration-dimensional acceleration (including deceleration) command value is calculated from the deviation of the vehicle speed, and an acceleration-dimensional angular acceleration (or angle-of-traverse acceleration, omitted below) command value is calculated from the deviation of the angular velocity. The acceleration command value corresponds to an acceleration (including deceleration) necessary for the vehicle 100 to reach the target position P6n until the next calculation. The angular acceleration command value corresponds to a steering angular acceleration necessary for the vehicle 100 to have a posture identical to the target posture until the next calculation. The acceleration command value is sent to the drive controller 20 or the brake controller 22 illustrated in FIG. 1. The angular acceleration command value is sent to the steering controller 24 illustrated in FIG. 1.

The drive controller 20 illustrated in FIG. 1 performs acceleration control of the vehicle 100 by controlling the current of the throttle valve and the electric motor in accordance with the acceleration command value. The brake controller 22 performs deceleration control of the vehicle 100 by controlling the current of the solenoid valve and the electric motor in accordance with the deceleration command value. The steering controller 24 performs steering control of the vehicle 100 by controlling the current of the electric motor in accordance with the angular acceleration command value.

Referring back to FIG. 3, the integrator 82 calculates a speed-dimensional vehicle speed from the acceleration-dimensional acceleration command value, and calculates a speed-dimensional angular velocity from the acceleration-dimensional angular acceleration command value. The integrator 84 calculates a distance-dimensional running position (distance) from the speed-dimensional vehicle speed, and calculates a distance-dimensional vehicle posture from the speed-dimensional angular velocity.

The speed detecting block 86 obtains a vehicle speed that reflects the result of acceleration/deceleration control, that is, the current vehicle speed, and obtains a steering angular velocity that reflects the result of steering control, that is, the current steering angular velocity. Here, the vehicle speed obtaining unit 28 obtains the vehicle speed, and the steering angle obtaining unit 32 obtains the steering angular velocity.

The running position detecting block 88 obtains a running position that reflects the result of acceleration/deceleration control, that is, the current running position, and obtains a vehicle posture that reflects the result of steering control, that is, the current vehicle posture. As a result, the latest and actual running path is obtained. Here, the running position obtaining unit 26 obtains the running position and the vehicle posture. The running path obtaining unit 34 stores information on the running position and the vehicle posture obtained by the running position obtaining unit 26, and updates the latest and actual running path. The latest and actual running path is sent to the target path correcting block 74.

The period setting unit 48 illustrated in FIG. 1 sets the calculation period of the feedback loop L1 (the number of times the acceleration/deceleration speed is updated) to be shorter than the calculation period of the feedback loop L2 (the number of times the target path is updated). In doing so, the feedback system S1 is prevented from becoming oscillatory, and the responsiveness of the vehicle speed adjustment can be enhanced. As a result, the responsiveness of the position adjustment is additionally enhanced.

With the above-described feedback control, a new target path On that the vehicle 100 can reasonably follow is set. At the time the vehicle 100 stably follows the new target path On, the target path setting unit 54 resets the target path Of of the vehicle 100 on the basis of running route information obtained by the route obtaining unit 16.

2-1-2. Target Path Correction and Deviation Acquisition

The details of a target path correcting process and a deviation obtaining process performed by the deviation obtaining unit 42 and the correction unit 44 illustrated in FIG. 1, that is, the target path correcting block 74 illustrated in FIG. 3, will be described mainly using FIGS. 2 and 4.

In FIG. 2, the vehicle 100 runs along the target path Of from a time point T1 to a time point T2, but deviates from the target path Of at the time point T2 under the influence of understeer or the like. The vehicle 100 runs along the actual running path Os, which deviates from the target path Of, from the time point T2 to a time point T5, and reaches the running position Ps at the time point T5.

Figure 4:
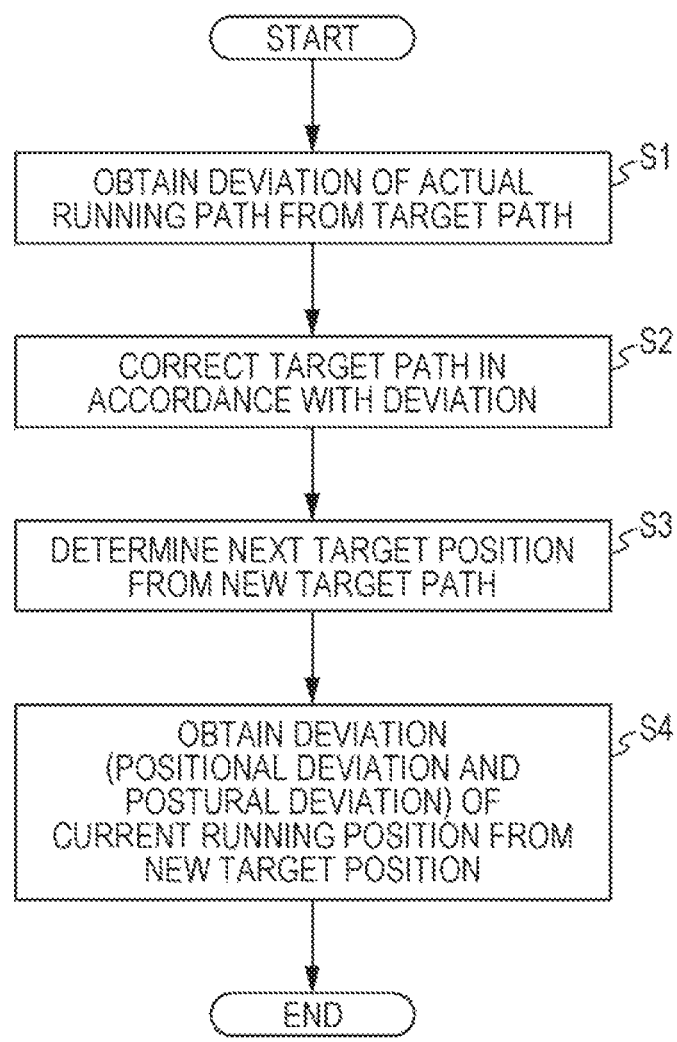
FIG. 4 is a flowchart of a target path correction process and a deviation obtaining process according to the first embodiment.

In step S1 in FIG. 4, the deviation obtaining unit 42 obtains a deviation of the actual running path Os from the target path Of. At the time point T5 illustrated in FIG. 2, the deviation obtaining unit 42 calculates and obtains the positional deviation D1 of the running position Ps from the current target position P5. The running position Ps at the time point T5 is obtained by the running position obtaining unit 26, and the target position P5 has been set by the target value setting unit 52.

Figure 5A:
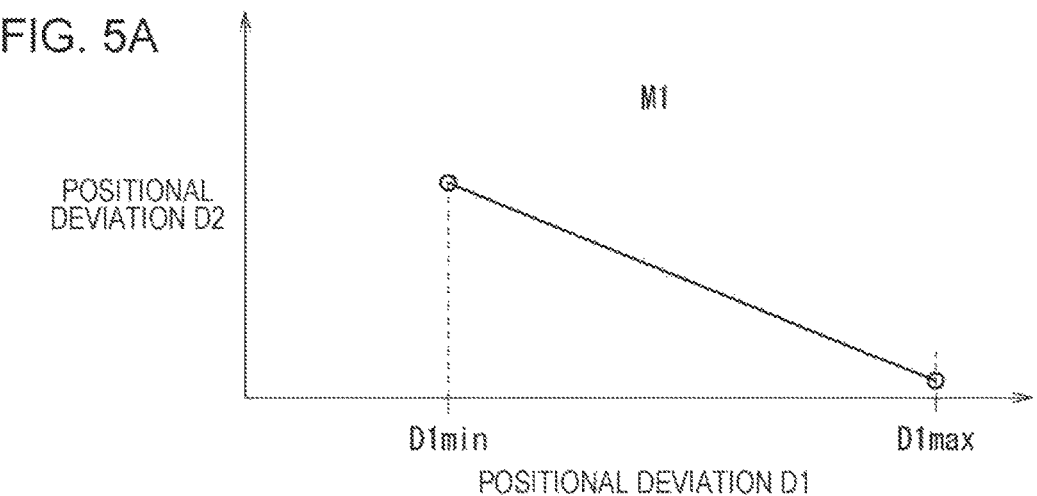
FIGS. 5A to 5C are diagrams illustrating maps used in target path correction.

In step S2, the correction unit 44 corrects the target path Of in accordance with the size of the positional deviation D1 calculated by the deviation obtaining unit 42. In the first embodiment, the target path Of is corrected, and a new target path On is set between the target path Of and the actual running path Os. At this time, the new target path On is made closer to the actual running path Os as the positional deviation D1 becomes greater. In this process, for example, a map M1 such as that illustrated in FIG. 5A is used.

In the map M1, the positional deviation D1 of the actual running path Os from the original target path Of is plotted on the abscissa, and the positional deviation D2 of the actual running path Os from the new target path On is plotted on the ordinate. In the map M1, the greater the positional deviation D1, the smaller the positional deviation D2. In other words, the greater the positional deviation D1, the closer the new target path On toward the actual running path Os. Using the map M1, the correction unit 44 makes the new target path On closer to the actual running path Os as the positional deviation D1 becomes greater. Here, a new position P5n whose distance from the running position Ps is D2 (<D1) is set between the running position Ps and the original target position P5. Then, a new target path On including the new position P5n is set. Needless to say, another target position on the original target path Of may be made closer to the actual running path Os.

In step S3, the correction unit 44 determines a new target position P6n serving as the next target from the new target path On. Next in step S4, the correction unit 44 calculates and obtains a deviation (positional deviation) of the current running position Ps from the new target position P6n. The correction unit 44 also calculates and obtains a deviation (postural deviation) of the current vehicle posture from the vehicle posture at the new target position P6n. The obtained positional deviation and postural deviation are sent to the proportional controller 76 (running support controller 46) illustrated in FIG. 3. The proportional controller 76 performs the above-mentioned P control.

By the way, when the positional deviation D1 is too great in step S2, it is more appropriate to cancel or prohibit the running support control and to provide braking control of the vehicle 100, instead of correcting the original target path Of. Thus, in the embodiment, the upper limit value D1max of the positional deviation D1 is set, as illustrated in FIG. 5A. When the positional deviation D1 is greater than or equal to the upper limit value D1max, a certain deceleration command value is sent from the acceleration/deceleration instruction unit 56 to the brake controller 22. The brake controller 22 controls the braking of the vehicle 100 in accordance with the deceleration command value.

When the positional deviation D1 is small in step S2, the vehicle 100 can follow the original target path Of. Thus, in the embodiment, the lower limit value D1min of the positional deviation D1 is set, as illustrated in FIG. 5A. When the positional deviation D1 is less than or equal to the lower limit value D1min, no correction of the target path Of is performed.

Although the relationship between the positional D1 and the positional deviation D2 is linear in the map M1 illustrated in FIG. 5A, the relationship may be non-linear. For example, like a map M2 illustrated in FIG. 5B, the following settings may be made between the lower limit value D1min and the upper limit value D1max: the smaller the positional deviation D1, the greater the change rate of the positional deviation D2; and the greater the positional deviation D1, the smaller the change rate of the positional deviation D2. Alternatively, the following settings may be made: the smaller the positional deviation D1, the smaller the change rate of the positional deviation D2; and the greater the positional deviation D1, the greater the change rate of the positional deviation D2. Like a map M3 illustrated in FIG. 5C, the following setting may be made: the greater the positional deviation D1, the smaller the positional deviation D2 becomes in a stepwise manner. Alternatively, a table may be used, instead of using the maps M1 to M3.

2-2. Second Embodiment (When Correcting Target Position on Target Path)

Figure 6:
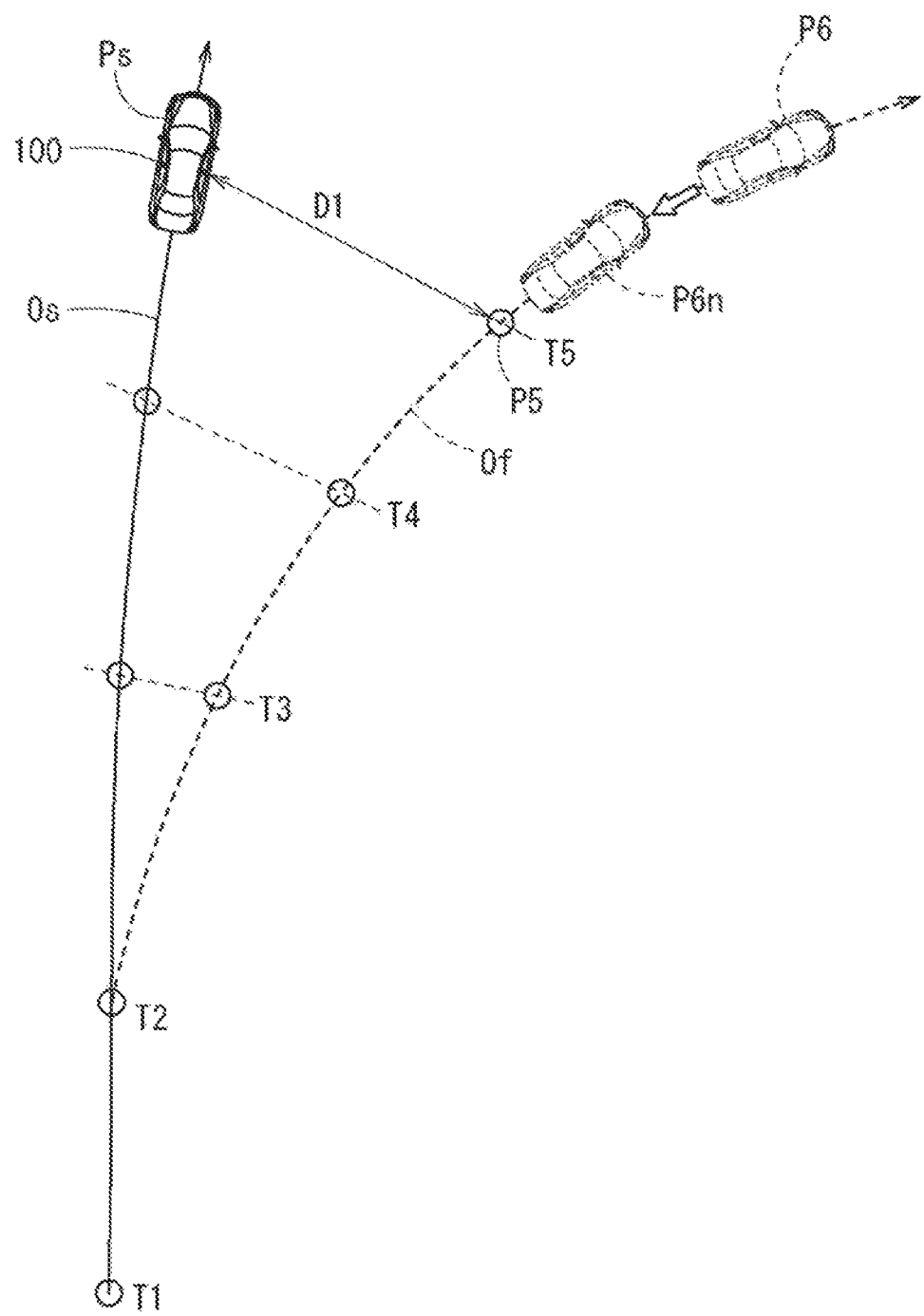
FIG. 6 is a diagram for describing correction of a target position according to a second embodiment.

Now, as illustrated in FIG. 6, a second embodiment will be described in which a target position P6, which is one target running state, is corrected on the target path Of to set a new target position P6n. In the second embodiment, feedback control such as that illustrated in FIG. 7 is performed.

2-2-1. Feedback System S2

Figure 7:
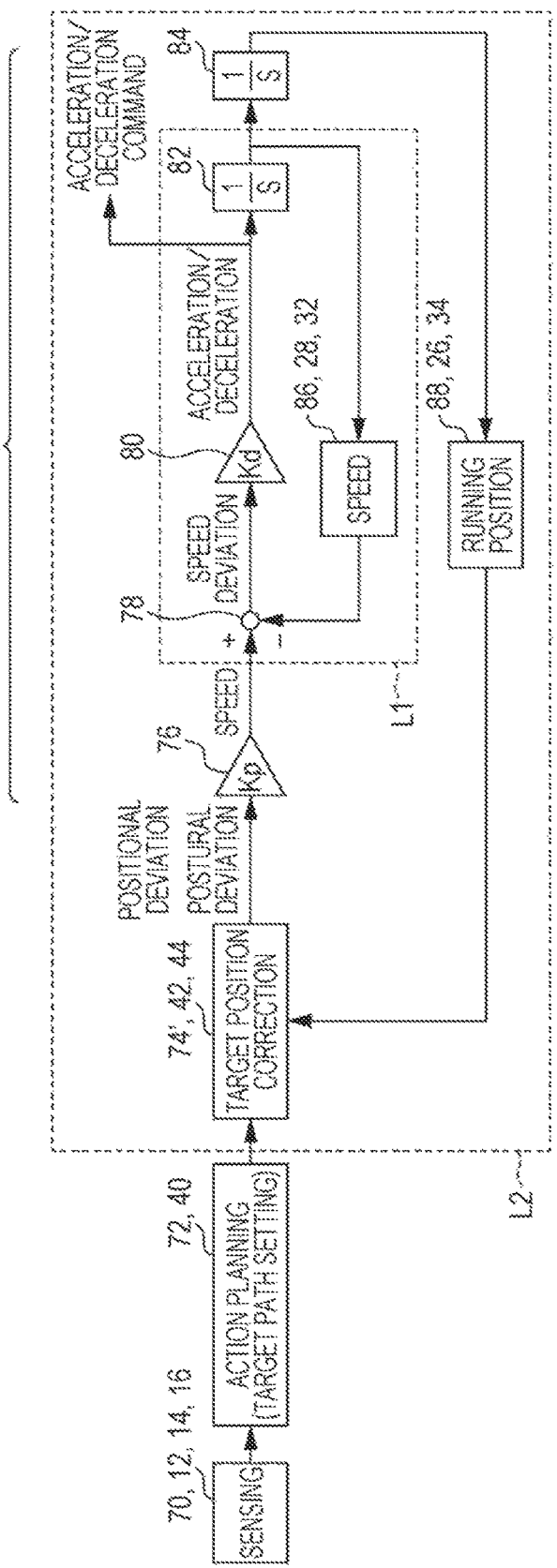
FIG. 7 is a block diagram of feedback control according to the second embodiment.

A feedback system S2 illustrated in FIG. 7 has many configurations common to those of the feedback system S1 illustrated in FIG. 3. Descriptions of the common configurations are omitted. What is different is a target position correcting block 74'.

Besides the target path Of being sent from the action planning block 72, the actual running path Os is sent from the running position detecting block 88 to the target position correcting block 74'. The target position correcting block 74' sets a new target position P6n by correcting the next target position P6 on the target path Of, and further obtains a deviation of the current running position Ps from the next target position P6n. Here, the deviation obtaining unit 42 obtains a positional deviation D1 of the running position Ps from the target position P5. Next, the correction unit 44 sets a new target position P6n in accordance with the positional deviation D1, and obtains a positional deviation and a postural deviation of the current running position Ps from the next target position P6n. The details of the process performed by the target position correcting block 74' will be described in "2-2-2. Target Position Correction and Deviation Acquisition" described below. The obtained positional deviation and postural deviation are sent to the proportional controller 76.

2-2-2. Target Position Correction and Deviation Acquisition

The details of a target position correcting process and a deviation obtaining process performed by the deviation obtaining unit 42 and the correction unit 44 illustrated in FIG. 1, that is, the target position correcting block 74' illustrated in FIG. 7, will be described mainly using FIGS. 6 and 8.

Figure 8:
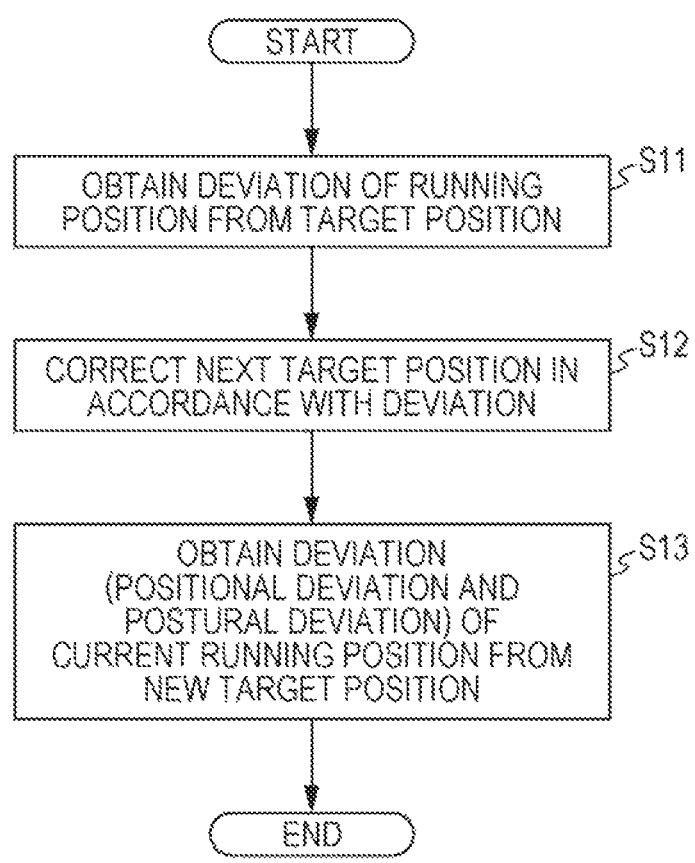
FIG. 8 is a flowchart of a target path correction process and a deviation obtaining process according to the second embodiment.

In step S11 in FIG. 8, the deviation obtaining unit 42 obtains a deviation of the running position Ps from the target position P5. At the time point T5 illustrated in FIG. 6, the deviation obtaining unit 42 calculates and obtains the positional deviation D1 of the running position Ps from the current target position P5. The running position Ps at the time point T5 is obtained by the running position obtaining unit 26, and the target position P5 has been set by the target value setting unit 52.

Figure 5B:
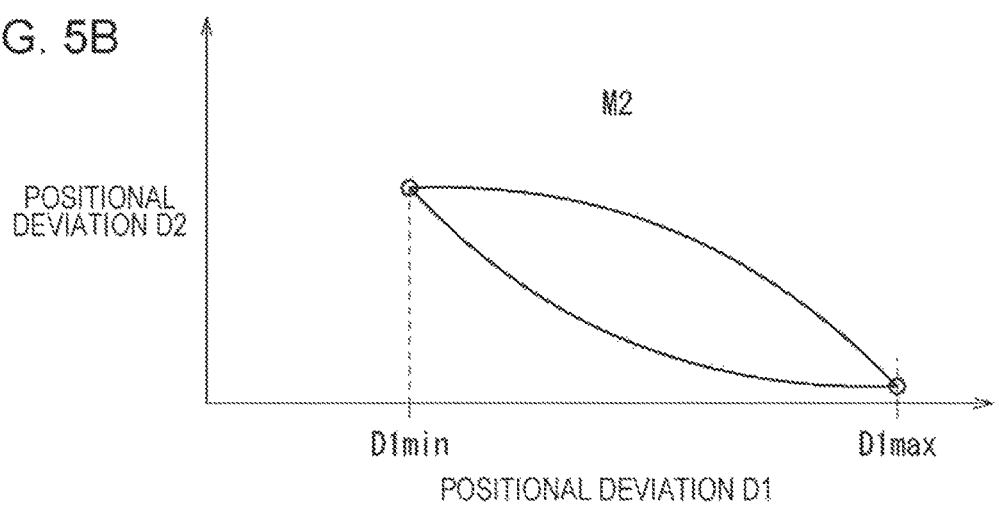
Figure 5C:
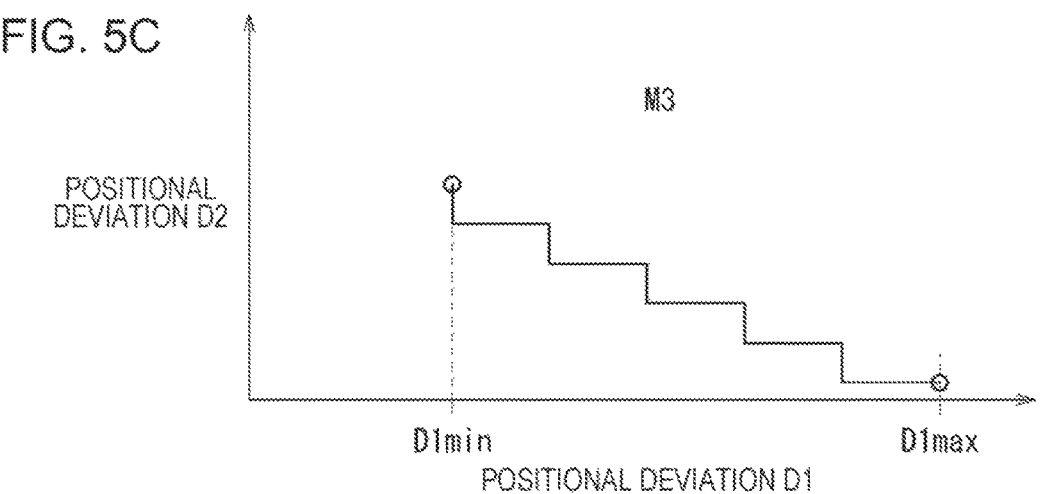

In step S12, the correction unit 44 corrects the next target position P6 in accordance with the size of the positional deviation D1 calculated by the deviation obtaining unit 42. In the second embodiment, the next target position P6 is corrected rearward in the progressing direction to set a new target position P6n. At this time, the amount of recession is made greater as the positional deviation D1 becomes greater such that the new target position P6n becomes closer to the current running position Ps. Maps equivalent to the maps M1 to M3 illustrated in FIGS. 5A to 5C are usable for this process, or a table or the like may alternatively be used.

In step S13, the correction unit 44 calculates and obtains a deviation (positional deviation) of the current running position Ps from the new target position P6n. The correction unit 44 also calculates and obtains a deviation (postural deviation) of the current vehicle posture from the vehicle posture at the new target position P6n. The obtained positional deviation and postural deviation are sent to the proportional controller 76 (running support controller 46) illustrated in FIG. 3. The proportional controller 76 performs the above-mentioned P control.

2-3. Modification of First and Second Embodiments (When Lateral Position is Corrected)

In the first and second embodiments, the positional deviation (positional deviation in the longitudinal and lateral directions) of the current running position Ps from the new target position P6n is made smaller. Alternatively, in the first and second embodiments, only the positional deviation in the lateral direction of the current running position Ps from the new target position P6n may be made smaller.

In this case, the target path correcting block 74 illustrated in FIG. 3 and the target position correcting block 74' illustrated in FIG. 7 obtain the positional deviation in the lateral direction. The proportional controller 76 calculates and obtains a Yaw rate command value or a steering angular velocity command value. The subtractor 78 calculates a deviation of the current Yaw rate from the Yaw rate command value, or calculates a deviation of the current steering angular velocity from the angular velocity command value. The differentiator 80 calculates and obtains an angle-of-traverse acceleration command value or an angular acceleration command value. The angular acceleration command value is sent to the steering controller 24 illustrated in FIG. 1. The steering controller 24 performs steering control of the vehicle 100 by controlling the current of the electric motor in accordance with the angular acceleration command value.

2-4. Conclusion of First and Second Embodiments

The vehicle running control apparatus 10 includes the running state obtaining unit 14, the target running state setting unit 40, the deviation obtaining unit 42, the running support controller 46 (controller), and the correction unit 44. The running state obtaining unit 14 obtains the actual running state (actual running path Os, running position Ps, and so forth), which is the current running state of the vehicle 100. The target running state setting unit 40 sets the target running state (target path Of and target positions P5 and P6), which is the target running state of the vehicle 100. The deviation obtaining unit obtains a deviation of the actual running state from the target running state. The running support controller 46 performs running support control of the vehicle 100 such that, when the deviation obtaining unit 42 obtains the deviation, the running state of the vehicle 100 becomes identical or closer to the target running state. The correction unit 44 makes the target running state, set by the target running state setting unit 40, closer to the actual running state as the deviation becomes greater.

According to the first and second embodiments, when the deviation is small, running support is provided following the preset target running state (target path Of and target positions P5 and P6). Therefore, scheduled running becomes possible. In contrast, when the deviation is great, it becomes easier for the vehicle 100 to follow the target running state (new target path On and new target position P6n). Therefore, excessive vehicle control can be prevented in automated driving or semi-automated driving, thereby enhancing the running stability of the vehicle 100.

The vehicle running control apparatus 10 includes the vehicle speed obtaining unit 28, which obtains the vehicle speed, which is the running speed, of the vehicle 100, and the drive controller 20 and the brake controller 22 (acceleration/deceleration controller), which support acceleration/deceleration of the vehicle 100. The correction unit 44 corrects the target path Of or the target position P5 or P6 on the basis of the running position Ps obtained by the running position obtaining unit 26. The running support controller 46 (controller) performs acceleration/deceleration control using the drive controller 20 and the brake controller 22 on the basis of the vehicle speed obtained by the vehicle speed obtaining unit 28 such that the vehicle 100 follows the new target path On or target position P6n. At this time, the period setting unit 48 sets the number of updates per unit time of a command value in acceleration/deceleration control to be greater than the number of updates per unit time of the target path Of, the updates being performed by the correction unit 44.

The vehicle running control apparatus 10 includes the steering angle obtaining unit 32 (steering angular velocity obtaining unit), which obtains the steering angular velocity of the vehicle 100, and the steering controller 24, which supports steering of the vehicle 100. The correction unit 44 corrects the target path Of on the basis of the running position Ps obtained by the running position obtaining unit 26. The running support controller 46 (controller) performs steering control using the steering controller 24 on the basis of the steering angular velocity obtained by the steering angle obtaining unit 32 such that the vehicle 100 follows the new target path On. At this time, the period setting unit 48 sets the number of updates per unit time of a command value in steering control to be greater than the number of updates per unit time of the target path Of, the updates being performed by the correction unit 44.

According to the first and second embodiments, the responsiveness of vehicle speed adjustment and steering adjustment can be enhanced, and accordingly the position adjustment can be made responsive in accordance therewith. In doing so, the stability of controlling the vehicle 100 to follow the new target path On or the new target position P6n can be improved.

2-5. Third Embodiment

In the first embodiment described using FIGS. 2 to 5 and the second embodiment described using FIGS. 6 to 8, the actual running path Os and the current running position Ps serve as the actual running state of the vehicle 100, and the original target path Of and the next target position P6 serve as the target running state of the vehicle 100.

Alternatively, in the present application, the vehicle speed may serve as the running state of the vehicle 100, and the target vehicle speed may serve as the target running state. For example, if the roadway conditions become poor when the vehicle 100 is running following the target vehicle speed, the actual vehicle speed may be unable to catch up with the target vehicle speed. Even in such a case, the vehicle running control apparatus 10 illustrated in FIG. 1 is usable.

In this case, the target value setting unit 52 sets a target vehicle speed on the basis of various types of information obtained by the running state obtaining unit 14. The deviation obtaining unit 42 obtains the current vehicle speed from the vehicle speed obtaining unit 28, and calculates and obtains a deviation of the current vehicle speed from the target vehicle speed. The correction unit 44 makes the target vehicle speed closer to the current vehicle speed as the deviation obtained by the deviation obtaining unit 42 becomes greater. Specifically, the correction unit 44 lowers the target vehicle speed. The acceleration/deceleration instruction unit 56 sends an acceleration command value in accordance with the target vehicle speed, corrected by the correction unit 44, to the drive controller 20 and the brake controller 22. In response, the vehicle 100 can follow the target vehicle speed without performing excessive acceleration/deceleration.

Instead of the vehicle speed, an acceleration (deceleration) may serve as the running state of the vehicle. Instead of the target vehicle speed, a target acceleration (deceleration) may serve as the target running state of the vehicle 100.

Alternatively, a Yaw rate may serve as the running state of the vehicle 100, and a target Yaw rate may serve as the target running state. For example, while the vehicle 100 is running around a curve following the target Yaw rate, the actual Yaw rate may be unable to catch up with the target Yaw rate under the influence of the understeer. Even in such a case, the vehicle running control apparatus 10 illustrated in FIG. 1 is usable.

In this case, the target value setting unit 52 sets a target Yaw rate on the basis of various types of information obtained by the running state obtaining unit 14. The deviation obtaining unit 42 obtains the current Yaw rate from the Yaw rate obtaining unit 30, and calculates and obtains a deviation of the current Yaw rate from the target Yaw rate. The correction unit 44 makes the target Yaw rate closer to the current Yaw rate as the deviation obtained by the deviation obtaining unit 42 becomes greater. Specifically, the correction unit 44 lowers the target Yaw rate. The steering instruction unit 58 sends an angle-of-traverse acceleration command value in accordance with the target Yaw rate, corrected by the correction unit 44, to the steering controller 24. In response, the vehicle 100 can follow the target Yaw rate without performing excessive steering.

Instead of the Yaw rate, a steering angular acceleration (deceleration) or a lateral G force may serve as the running state of the vehicle 100. Instead of the target Yaw rate, a target angular acceleration (deceleration) or a target lateral G force may serve as the target running state of the vehicle 100.

2-6. Conclusion of Third Embodiment

In the third embodiment, the running state obtaining unit 14 includes the vehicle speed obtaining unit 28 and the Yaw rate obtaining unit 30. The target value setting unit 52 of the target running state setting unit 40 sets a target value of at least one of the vehicle speed and the Yaw rate. The deviation obtaining unit 42 obtains at least one of a deviation of the vehicle speed, obtained by the vehicle speed obtaining unit 28, from the target vehicle speed (vehicle speed target value), and a deviation of the Yaw rate, obtained by the Yaw rate obtaining unit 30, from the target Yaw rate (Yaw rate target value). The correction unit 44 lowers the target vehicle speed and/or the target Yaw rate as the deviation becomes greater.

In the third embodiment, the actual running state refers to the vehicle speed and/or the Yaw rate. The target running state refers to the target vehicle speed and/or the target Yaw rate. Alternatively, an acceleration, an angle-of-traverse acceleration, a steering angular velocity, a steering angular acceleration, a lateral G force, or the like may serve as the actual running state and the target running state.

According to the third embodiment, it becomes easier for the vehicle 100 to follow the target vehicle speed and/or the target Yaw rate. Therefore, excessive vehicle control can be prevented in automated driving or semi-automated driving, thereby enhancing the running stability of the vehicle 100. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle running control apparatus comprising:
a running state obtaining detector that obtains an actual running state, which is a current running state of a vehicle;
a target running state setting controller that sets a target running state, which is a target running state of the vehicle;
a deviation obtaining controller that obtains a deviation of the actual running state from the target running state;
a running support controller that performs, when the deviation obtaining unit obtains the deviation, running support control of the vehicle such that the running state of the vehicle becomes identical or closer to the target running state;
a correction controller that corrects the target running state, set by the target running state setting controller, in accordance with the deviation, the correction controller correcting the target running state to be closer to the actual running state as the deviation becomes greater; and
an external condition obtaining detector that obtains an external condition of the vehicle,
wherein the running state obtaining detector includes
a running path obtaining detector that obtains an actual running path of the vehicle,
wherein the target running state setting controller includes
a target path setting controller that sets a target path of the vehicle on the basis of the external condition obtained by the external condition obtaining detector,
wherein the deviation obtaining controller obtains a path deviation of the actual running path from the target path,
wherein the running support controller performs running support control of the vehicle such that, when the deviation obtaining controller obtains the path deviation, the running path of the vehicle becomes identical or closer to the target path, and
wherein the correction controller corrects the target path, set by the target path setting controller, in accordance with the path deviation, the correction controller correcting the target path to be closer to the actual running path as the path deviation becomes greater.

2. The vehicle running control apparatus according to claim 1, wherein
the running state obtaining detector includes a running position obtaining detector that obtains a running position of the vehicle,
the target running state setting controller sets a target position of the running position,
the deviation obtaining controller obtains a position deviation of the running position, obtained by the running position obtaining detector, from the target position, and
the correction controller corrects the target position to be more rearward in a progressing direction as the position deviation becomes greater.

3. The vehicle running control apparatus according to claim 2, further comprising:

a vehicle speed obtaining detector that obtains a vehicle speed, which is a running speed of the vehicle; and an acceleration/deceleration controller that assists acceleration/deceleration of the vehicle by using a command value, wherein the correction controller corrects the target path or the target position on the basis of the running position obtained by the running position obtaining detector, and wherein the running support controller performs acceleration/deceleration control using the acceleration/deceleration controller on the basis of the vehicle speed obtained by the vehicle speed obtaining detector such that the vehicle follows the corrected target path or the corrected target position, and sets a number of updates per unit time of the command value in the acceleration/deceleration control to be greater than a number of updates per the unit time of the target path performed by the correction controller.

4. The vehicle running control apparatus according to claim 2, further comprising:

a steering angular velocity obtaining controller that obtains a steering angular velocity of the vehicle; and a steering controller that assists steering of the vehicle by using a command value, wherein the correction controller corrects the target path on the basis of the running position obtained by the running position obtaining detector, and wherein the running support controller performs steering control using the steering controller on the basis of the steering angular velocity obtained by the steering angular velocity obtaining controller such that the vehicle follows the corrected target path, and sets a number of updates per unit time of the command value in the steering control to be greater than a number of updates per the unit time of the target path performed by the correction controller.

5. The vehicle running control apparatus according to claim 1, wherein the running state obtaining detector includes at least one of a vehicle speed obtaining detector that obtains a vehicle speed, which is a running speed of the vehicle, and a Yaw rate obtaining detector that obtains a Yaw rate of the vehicle, the target running state setting controller sets a target value of at least one of the vehicle speed and the Yaw rate, the deviation obtaining controller obtains at least one of a speed deviation of the vehicle speed, obtained by the vehicle speed obtaining detector, from the target value of the vehicle speed, and a Yaw rate deviation of the Yaw rate, obtained by the Yaw rate obtaining detector, from the target value of the Yaw rate, and the correction controller lowers more the target value as the speed deviation or the Yaw rate deviation becomes greater.

6. The vehicle running control apparatus according to claim 1, wherein the correction controller determines whether the deviation is smaller than a predetermined lower limit threshold, and if so, the correction controller terminates the correction of the target running state.

7. The vehicle running control apparatus according to claim 1, wherein the correction controller determines whether the deviation is larger than a predetermined upper limit threshold, and if so, the correction controller terminates the correction of the target running state.

8. A vehicle running control method comprising steps of:

(i) obtaining an actual running state, which is a current running state of a vehicle;

(ii) setting a target running state, which is a target running state of the vehicle;

(iii) obtaining a deviation of the actual running state from the target running state;

(iv) performing, by using a computer, running support control of the vehicle such that the running state of the vehicle becomes identical or closer to the target running state;

(v) correcting, by using the computer, the target running state in accordance with the deviation by correcting the target running state to be closer to the actual running state as the deviation becomes greater;

(vi) obtaining an external condition of the vehicle;

(vii) obtaining an actual running path of the vehicle, wherein the step (ii) sets a target path of the vehicle on the basis of the external condition, wherein the step (iii) obtains a path deviation of the actual running path from the target path, wherein the step (iv) performs running support control of the vehicle such that the running path of the vehicle becomes identical or closer to the target path, and wherein the step (v) corrects the target path in accordance with the path deviation by correcting the target path to be closer to the actual running path as the path deviation becomes greater.

* * * * *